UNITED STATES PATENT OFFICE.

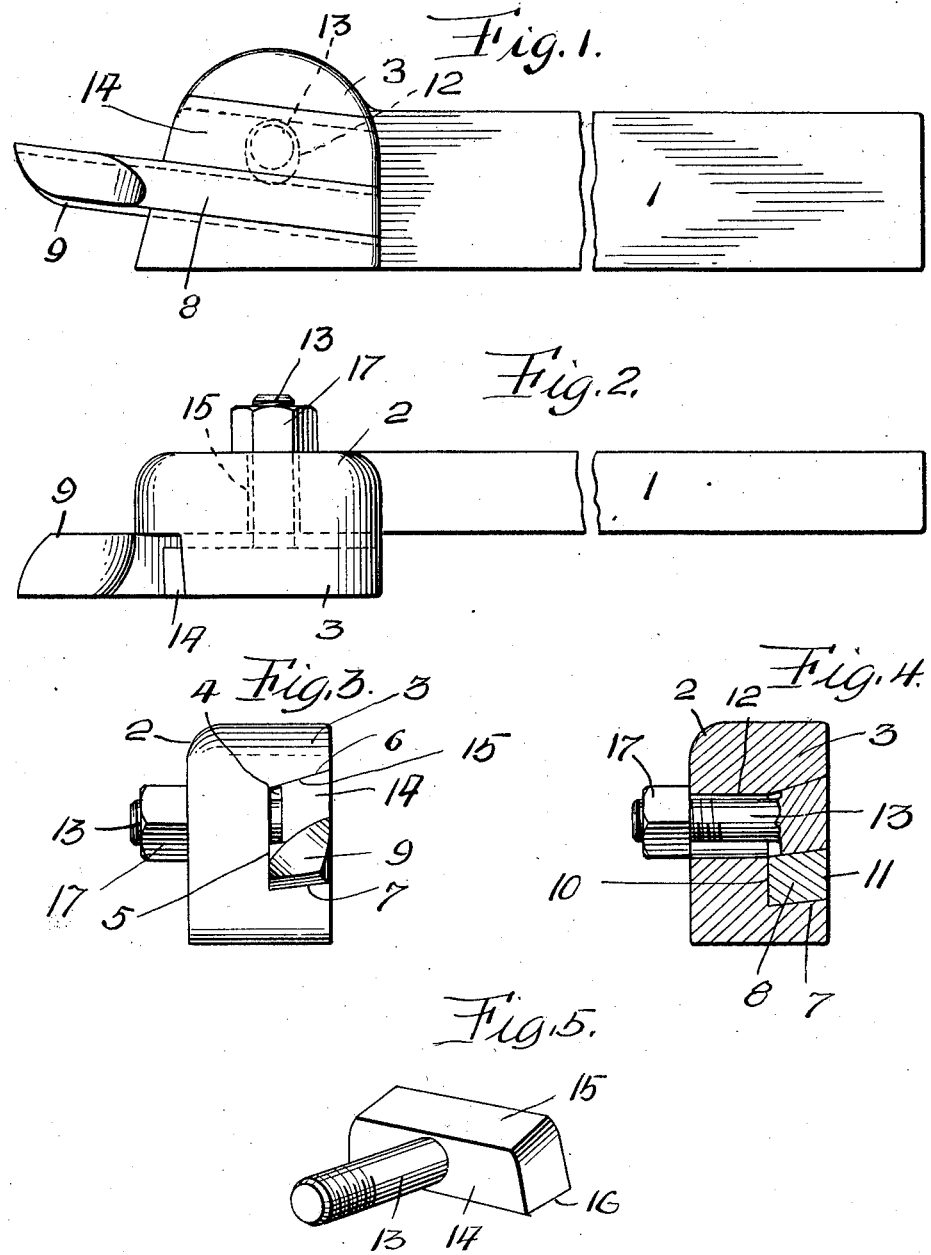

JOHN HARRY MILLER, OF CHAMBERSBURG, PENNSYLVANIA.

TOOL-HOLDER.

1,057,257. Specification of Letters Patent. Patented Mar. 25, 1913.

Application filed April 17, 1912. Serial No. 691,440.

*To all whom it may concern:*

Be it known that I, JOHN HARRY MILLER, a citizen of the United States of America, residing at Chambersburg, in the county of Franklin and State of Pennsylvania, have invented certain new and useful Improvements in Tool-Holders, of which the following is a specification, reference being had therein to the accompanying drawing.

This invention relates to a tool holder, and the primary object of my invention is to provide a tool holder with positive and reliable means, in a manner that will be hereinafter set forth, for positively retaining a bit or tool in engagement with the holder, whereby the bit or tool cannot become accidentally displaced when in operation.

Another object of this invention is to provide a tool holder for holding self hardening tool steel, the holder being constructed whereby the self hardening tool steel cannot readily break on account of the manner in which it is held.

A further object of this invention is to provide a tool holder that can be used in connection with lathes of various types, boring and threading machines and in connection with various kinds of mill work.

A still further object of this invention is to provide a tool holder consisting of comparatively few parts that are strong and durable, inexpensive to manufacture and easy to manipulate.

With the above and other objects in view as may hereinafter appear, the invention resides in the novel construction, combination and arrangement of parts to be hereinafter more specifically described and then claimed.

Reference will now be had to the drawing, wherein:—

Figure 1 is a side elevation of a tool holder in accordance with this invention, Fig. 2 is a plan of the same, Fig. 3 is an end view of the tool holder, Fig. 4 is a cross sectional view of the same, and Fig. 5 is a perspective view of a detached tool clamping member.

A tool holder in accordance with this invention comprises a rectangular shank 1 having the forward end thereof provided with a large head 2. The head 2 is approximately twice the width of the shank 1 and said head has the off-set side 3 thereof provided with a longitudinal inclined slot 4, said slot being inclined rearwardly the entire length of the head. The slot 4 has a vertical wall 5 and beveled side walls 6 and 7, the walls 6 and 7 being in parallelism. The slot 4 is approximately half the depth of the head 2 and said slot is adapted to receive a bit or tool 8 having a cutting edge 9. The bit 8 has a vertical wall 10 to engage the wall 5, another vertical wall 11 flush with the outer side of the head 2 and the other sides of the bit beveled in parallelism whereby one side of said bit will rest upon the beveled wall 7 of the slot 4.

The head 2 has a transverse opening 12 in communication with the slot 4 and this opening is oval in cross section and is adapted to receive a bolt 13 carried by a tool clamping member 14. This member corresponds in length to the slot 4 and has the top and bottom thereof beveled, as at 15 and 16 to engage the wall 6 of the slot 4 and the top of the bit 8.

By screwing a nut 17 upon the bolt 13, the member 14 is drawn into the slot 4 to bind and lock the bit 8 within the lower part of said slot. With the clamping member 14 of a length corresponding to the head 2, the bit 8 will be firmly clamped in said head and prevented from breaking, as has been experienced when the bit 8 has a single contact point, such as a set screw for retaining it within the holder. The bit is firmly clamped upon three sides and the manner in which it is held renders the tool holder of particular value in connection with lathe work.

The invention is not limited to the size of the holder, the size of the bit to be held or the materials from which the holder is made.

What I claim is:—

A tool holder comprising a shank, a head carried thereby and having one side thereof provided with an inclined slot with the upper and lower walls of said slot beveled and parallel, a bit having upper and lower beveled sides adapted to rest in the bottom of said slot, a rectangular clamping member having upper and lower beveled sides adapted to fit in said slot between the upper side of said bit and the upper wall of said slot, and means integral with and projecting laterally from said clamping member and including a bolt and nut adapted to retain said member in the slot of said head, said bolt carried by and projecting laterally from said head and said nut mounted upon the bolt and engaging one side of the head.

In testimony whereof I affix my signature in the presence of two witnesses.

JOHN HARRY MILLER.

Witnesses:
 CHAS. B. MOORE,
 C. M. ORR.

Copies of this patent may be obtained for five cents each, by addressing the "Commissioner of Patents, Washington, D. C."